April 21, 1942.   H. E. MALONE   2,280,595
CONTROL DEVICE
Filed July 29, 1939   2 Sheets-Sheet 1
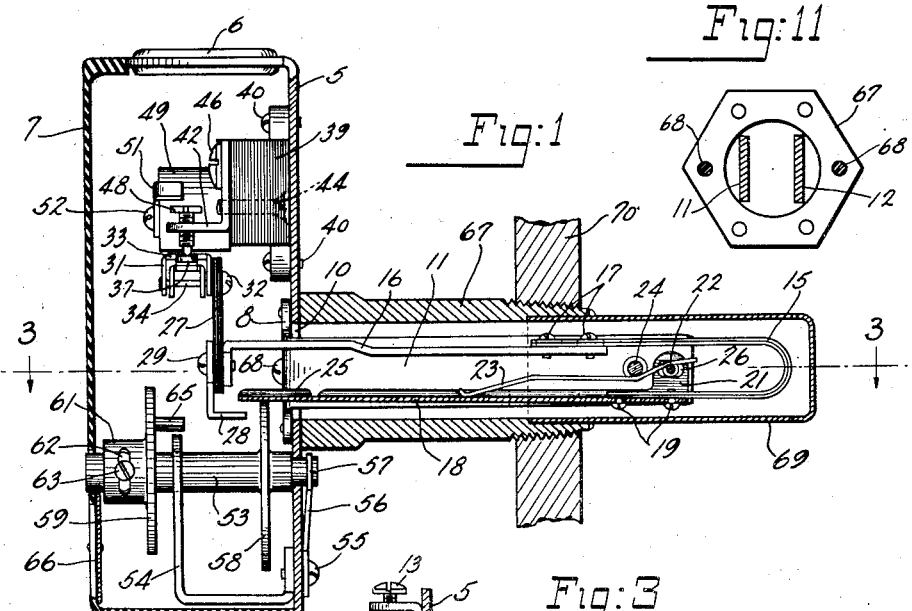
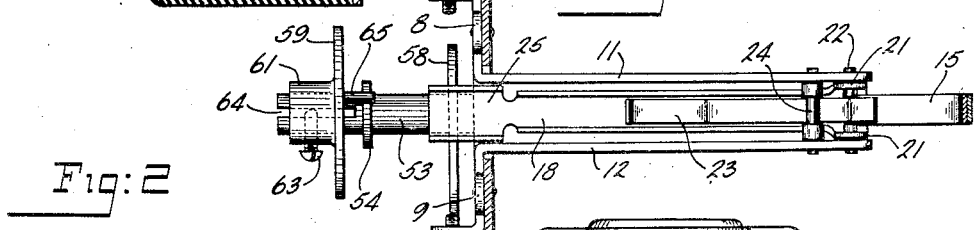
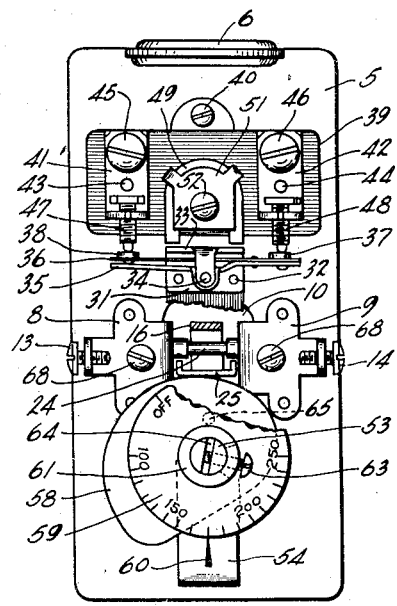
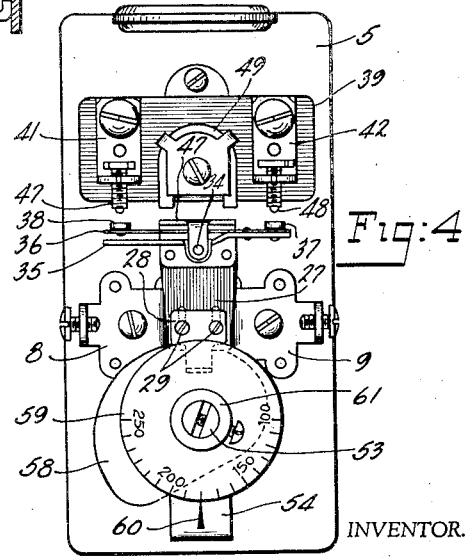
INVENTOR.
Homer E. Malone
BY
ATTORNEY.

April 21, 1942.　　　H. E. MALONE　　　2,280,595
CONTROL DEVICE
Filed July 29, 1939　　　2 Sheets-Sheet 2
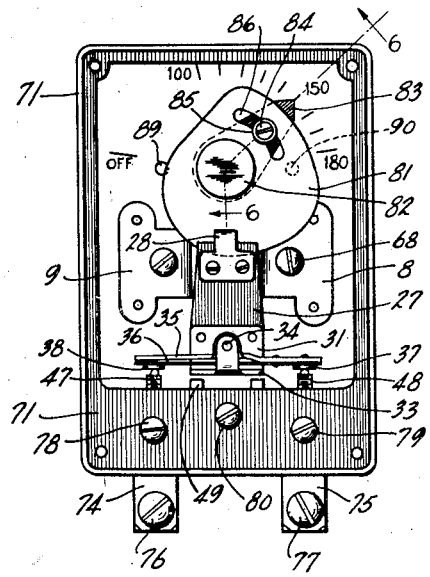
Fig: 5
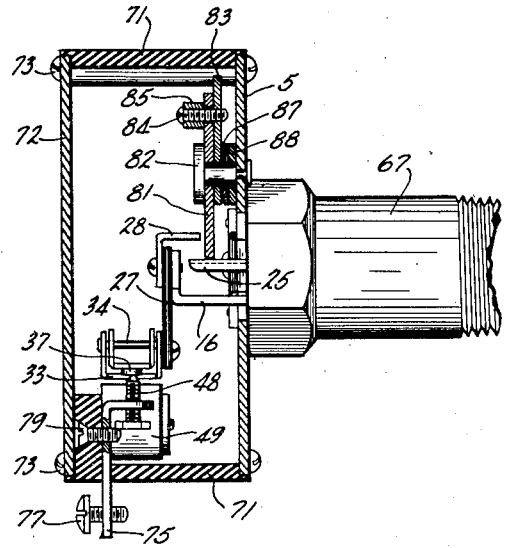
Fig: 6
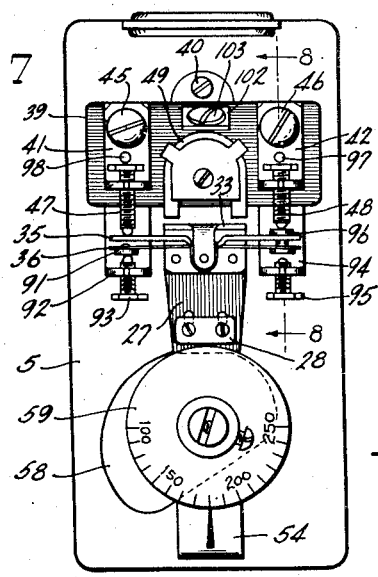
Fig: 7　　Fig: 8　　Fig: 9
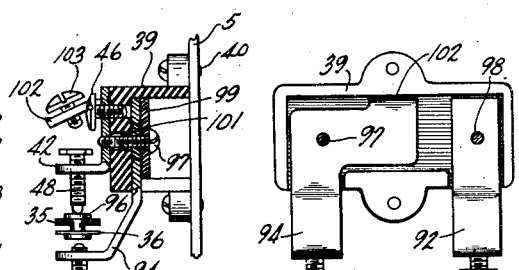
Fig: 10
INVENTOR.
Homer E. Malone
BY
ATTORNEY.

Patented Apr. 21, 1942

2,280,595

UNITED STATES PATENT OFFICE 2,280,595

CONTROL DEVICE

Homer E. Malone, Milwaukee, Wis., assignor to Perfex Corporation, Milwaukee, Wis., a corporation of Wisconsin Application July 29, 1939, Serial No. 287,263

17 Claims. (Cl. 200—139)

This invention relates in general to control devices and more particularly to automatic control devices for use in air conditioning systems.

In air conditioning systems it is customary, for example, to have some form of heating plant such as a steam boiler or hot water boiler to heat the air. Also in some air conditioning systems it is customary to use either a steam or hot water boiler to heat the air and then to circulate the heated air to the space being conditioned. The boilers are usually connected to radiators located in the space to be air conditioned. This invention relates to an automatic control device which will respond to a temperature condition of a boiler, radiator, refrigerator, etc. for the purpose of automatically controlling the operation of the air conditioning plant.

In some systems it is customary to provide a hot water boiler and a pump for circulating the hot water to the radiator. When such an arrangement is used, it is desirable to have some automatic control device which responds to the temperature of the water and which will prevent the pump from operating if the temperature of the water is not sufficiently warm to heat the space.

The present invention is concerned with an automatic control device which is arranged to respond to the various temperature changes of an air conditioning system for the purpose of automatically controlling the operation of the system, and the principal object of the invention is to provide an improved control device for the aforesaid purpose which will function to regulate the air conditioning system in a more reliable and satisfactory manner.

A further object is to provide a control device which is exceptionally sensitive to temperature changes and reliably accurate in operation so as to maintain the air conditioning system within any desired temperature values.

A further object is to provide an improved control device having a more simplified and accurate means of adjustment for regulating the response of the device at particular temperature values.

An additional object is to provide a control device in which the elements and parts thereof are arranged in a more compact manner whereby ease of adjustment, accessibility, and assembly are more readily obtained.

A further object of the invention is to design an improved control device of the immersion type which is adaptable for use as a high or low limit control or as an operating control in hot water heating systems.

Other objects and advantages reside in certain novel features of construction, arrangement and combination of the various parts which will be hereinafter more fully described and particularly pointed out in the claims.

It has been chosen to illustrate the invention in connection to an air conditioning system in which the automatic control device is associated directly with or attached onto a riser or pipe or to the boiler wall so that the temperature of the water or steam surrounding the control elements is effective to act upon the device to control the heating plant to either raise or lower the temperature of the air being conditioned. Other applications of the invention are contemplated, such as that in which the control device is associated with some other form of device being controlled or in which it operates to control valves and motors or circulating fans and other elements of an air conditioning system. In another of its applications it may be arranged to control the supply of domestic hot water in a household by shutting off the heater of a hot water tank when the temperature of the hot water reaches a certain value, or if the heater is inadvertently allowed to operate, to shut it off and thereby prevent overheating.

It is likewise contemplated that the invention be applicable to air conditioning systems in which the air to be conditioned is cooled instead of heated and the control device may therefor be arranged to regulate the temperature of a space to the desired coolness.

A preferred embodiment of the invention is illustrated in the accompanying two sheets of drawings in which:

Fig. 1 illustrates a side view of the control device with certain parts shown in cross section;

Fig. 2 is a front elevation of the device;

Fig. 3 is a top view taken along the line 3—3 of Fig. 1 with certain elements not shown;

Fig. 4 is a front elevation of a modified or reverse acting form of the device in which the switching elements are normally open;

Fig. 5 is a further modification of the control device in a more simplified form;

Fig. 6 is a partial cross section view taken along the line 6—6 of Fig. 5;

Fig. 7 is a further modified form of the control device illustrating a different form of the contact switching mechanism;

Fig. 8 is a cross sectional view along the line 8—8 of Fig. 7;

Fig. 9 is a rear view of a portion of the switching mechanism of Fig. 7;

Fig. 10 illustrates a fragmentary portion of the switching mechanism of Fig. 7 in its alternative position; while Fig. 11 is an end view of the control immersion well.

Throughout the following description the various elements or parts which are similar in the several figures are referred to for convenience by the same reference characters.

Referring now particularly to Figs. 1, 2 and 3, a suitable support or mounting base plate 5 is provided having a turned up projection at its upper end to provide means for securing a rubber grommet 6 through which the connecting wires for the control may be passed or for the attachment of a conduit pipe. A suitable insulating and protective cover 7 for enclosing the control device is provided. A pair of supporting members 8 and 9 are suitably riveted to the front of supporting plate 5, as shown, and have portions extending perpendicularly of and rearwardly through an opening 10 in the support plate 5. The rearwardly extending portions comprise parallel disposed supporting arms or brackets 11 and 12 for supporting the thermal actuating elements. The supporting members 8 and 9 are also provided with turned up flange portions for accommodating the cover securing screws 13 and 14.

The means responsive to a physical condition to which the control device responds is here shown in the form of a U-shaped bimetal or thermal element 15 arranged between the ends of the supporting arms 11 and 12. One end or leg of the bimetal element 15 is secured to the end of an operating arm or lever 16 by means of a pair of fastening screws 17. An adjusting arm or lever 18 having turned up edges to render it more rigid is secured at one end to the other end or leg of the bimetal element 15 by means of a pair of fastening screws 19. The adjusting arm 18 is provided with a pair of turned up ear portions 21 through which a pivoting pin 22 extends. The pivot pin 22 engages the supporting brackets 11 and 12 near their free ends and serves to pivot the adjusting arm 18. A tension biasing leaf spring 23 engages the top side of pivot pin 22 and the bottom side of a pin 24 supported on the sides of the supporting brackets 11 and 12. The pins 21 and 24 have reduced center portions of substantially the same width as the leaf spring 23 in order to maintain the leaf spring 23 in position to normally urge the adjusting arm 18 in a downward direction. The forward end portion of the adjusting arm 18 is provided with a slightly wider portion 25 of slightly less width than the distance between the supporting brackets 11 and 12 to prevent too great a side-play movement of the adjusting arm 18. In order to prevent binding of the adjusting arm 18 when an adjustment is made, as will be pointed out, a slot 26 is cut in one of the ear portions 21 of the adjusting arm 18 so that the arm 18 is free to move side-ways slightly and will not bind when adjusted. The operating arm 16 and the adjusting arm 18 are arranged in spaced parallel relationship and have their free ends extending from the legs of the bimetal element through the aperture 10 in the base 5 to the front side of the base. Both arms 16 and 18 as well as the thermal element 15 are also arranged between the two supporting brackets 11 and 12 and parallel thereto.

The forward end of the actuating arm 16 is arranged to carry an insulating plate 27 and also an angular stop bracket 28, both of which are secured to the actuating arm 16 by means of a pair of fastening screws 29 (see Fig. 4) which enter elongated screw slots in the insulating plate 27 in order to enable the elements to be properly aligned. The other end of insulating plate 27 is arranged to carry movable control means shown here in the form of contact switching mechanism. This control mechanism includes a U-shaped armature bracket 31 which is attached by a pair of screws 32 to the insulating plate 27. The bracket 31 is made of magnetic material and its bottom portion is arranged to constitute a magnetic armature 33. A pivot pin 34 extends through the turned up portions of the armature bracket 31 and is arranged to pivotally carry a rigid contact arm 35 (see Fig. 2). Suitably riveted to one end of the rigid arm 35 is a flexible contact carrying arm or bar 36 which carries at its extreme ends a pair of movable control elements or contact points 37 and 38.

The fixed or stationary portion of the control switching mechanism is supported upon an insulating block 39 held in its proper position upon base 5 by supporting screws 40. Upon the front end of terminal block 39 there is arranged a pair of spaced terminal brackets 41 and 42 secured to the block by means of screws 43 and 44 respectively, passing through the rear of the insulating block. A pair of terminal screws 45 and 46 thread into the terminal brackets 41 and 42 and serve for the connection of the incoming electrical conductors (not shown) for the device. The turned up portion of the terminal brackets 41 and 42 support adjustable contact studs 47 and 48 respectively, normally in engagement or contact with the movable contacts 37 and 38. A permanent magnet 49 is arranged upon the front of the block 39 between the terminal brackets 41—42 and is held firmly in position by means of a clamping plate 51 and a clamping screw 52. Its pole ends are arranged opposite and spaced from the armature 33 so as to magnetically influence the same.

In order to adjust the particular temperature value to which the control device is arranged to respond, a suitable adjusting means is provided. This adjusting means comprises a rotatable shaft 53 perpendicularly extending from the base 5 and having a supporting bearing surface in one end of a bracket member 54, which is in turn supported on the base 5 by screw 55. The rear end of shaft 53 has a bearing surface in the base and is supported by means of a tensioned leaf spring 56 having a forked end engaging a circumferential groove near the end of shaft 53. The leaf spring 56 is also secured to base 5 by the screw 55. The purpose of the leaf spring 56 is to provide frictional resistance to the shaft 53 to maintain it in its adjusted position.

The adjusting means further includes a cam disc 58 having a continuously variable radius of curvature around its periphery and in constant engagement with a portion of the lower surface of adjusting arm or lever 18. A portion of the cam periphery is also arranged with a flat surface, as shown. The tension stored in leaf spring 23 maintains the arm 18 in constant engagement with the curved periphery of cam 58. Adjacent the front end of the shaft 53 there is provided an adjusting dial or scale plate 59 having suitable indicia stamped around its periphery to indicate temperature values, in cooperation with a suitable stationary pointer 60 stamped upon the front of the shaft supporting bracket 54. In order to calibrate the position of the dial 59 upon the shaft 53 with respect to the thermal element 15 the end of the shaft 53 is split as indicated (see Fig. 3) and a slot 62 is cut in the hub 61 to accommodate calibrating screw 63. After the dial is adjusted to its proper calibrated position on the shaft 53, the screw 63 is turned in so that it engages one side of the slot 64 thereby expanding or spreading the slot sides apart at the ends and firmly holding the dial in its calibrated position on the shaft 53. In order to limit the rotative movement of dial 59 in either of its directions of movement a stop pin 65 is riveted to the rear of the dial plate and is adapted to engage opposite sides of the supporting bracket 54.

In order to observe the setting of the dial plate 59 when an adjustment is being made, the cover 7 is provided with a window 66 at its front end. With the cover in position, the end of the shaft 53 protrudes through an opening in the cover so that the slot 64 may be available for the insertion of a screw driver, for example, to rotatably adjust the dial plate 59 to the desired temperature value. If desired the periphery of the indicating dial 59 may be conveniently knurled so that it may be manually rotated when the cover is removed.

Since it is not convenient or desirable to directly immerse the thermal element 15 in the fluid medium stream to which it is responsive, a suitable well or enclosing bushing 67 is provided. This well includes a protective tube 69 having one end closed and with the other end suitably welded to the end of the well 67. This tube 69 serves as the medium for the transference of heat between the fluid medium and the thermal element. The supporting brackets 11 and 12 are also arranged so as to contact the inside walls of the well and tube without binding, however, so as to thermally conduct the heat to the bimetal element 15, as seen in Fig. 11. If desired the tube 69 may be slightly tapered at its closed end. The well 67 is secured to the rear of mounting plate 5 by means of a pair of supporting screws 68 threaded through supporting brackets 8 and 9 on opposite sides of the mounting plate opening 10. The attaching end of the well 67 is provided with a hexagonal headed portion whereby the other end may be threaded into the wall of a pipe or boiler 70, as indicated, and at the same time serve to support the complete control device in the desired position. The well 67 is arranged with a series of screw holes for the screws 68, as illustrated in Fig. 11, so that the well may be screwed into the wall 70. The control is then attached by screws 68 to any of the pair of screw holes in the nearest approximate desired mounted position, after which the well 67 may be given a further slight rotation to properly align the control. With this method of mounting the attaching means are readily accessible from the front of the control casing and the well may be immersed in the wall 70 as far as the hexagonal head. Suitable thermal insulation packing may be provided if desired between the control device and the walls 70 of the boiler or pipe.

In describing the operation of the control device, assume for example, that the dial plate 59 has been adjusted to a position in which the pointer 60 indicates a temperature value of 170°. At this value the control device is arranged to open the switching contacts. Assume now also that the control device is mounted on a boiler or hot water pipe 70 carrying the heating medium as shown and that the temperature of the heating medium is below the setting of the thermostat, the contacts therefor being closed. The protective tube 69 being immersed in the heating fluid medium is subjected to its direct heating action and transfers its heat by radiation and some conduction through the supporting brackets 11 and 12 to the bimetal element 15. As the temperature of the heating medium rises, bimetal element 15 rises in temperature correspondingly and proceeds to effect an expansive movement of the expanding outer portion of the element tending to move the element legs in a direction toward each other. As seen in Fig. 1, the lower end of the thermal element 15 is secured to the pivoted adjusting arm 18 and the full expansive movement of the element 15 is therefore directed upon the operating arm 16 tending to move it in a downward direction. Since the movable elements of the switching mechanism are carried by the insulating plate 27 at the end of arm 16 this mechanism is stressed in a direction tending to effect an opening of the control or switching contacts. The contacts are opened with snap action when the temperature value of the heating fluid reaches the value at which the dial plate 59 has been adjusted to.

The arrangement disclosed enables a relatively short thermal element to be utilized in which there are no pivots or hinge points between the active movable leg of the thermal element and the movable switching mechanism. The connection is direct and positive and therefore extremely acurate and sensitive in operation. By pivoting the adjusting arm 18 on pivot pin 22 directly adjacent the attaching point with the other leg of the thermal element and then biasing the adjusting arm with spring 23, extremely accurate temperature adjustments can be made of the thermal element. The operating arm 16 is substantially the same width as the thermal element and extends freely through the well 67 and opening 10 so that no binding with the side walls takes place. The arrangement also avoids the necessity of providing objectional guiding means for the arm 16 since it is rigidly attached to the bimetal element leg.

The snap action opening of the contacts is accomplished by the effort built up in the bimetal element 15 against the effort of the permanent magnet 49 tending to hold the armature 33. Only after the balance of effort between the bimetal and the magnet has been exceeded do the contacts open. This is because the flexibility of flexible arm 36 maintains the contacts 47—38 and 37—48 in engagement for a slight interval after the foregoing balance has been exceeded. After the contacts have been opened with snap action the operating arm 16 moves further to separate the contacts due to the tension accumulated in the bimetal element 15 and which has now acquired full control over the movable switching mechanism. The opening of the contacts may be arranged to reduce the output of the heating plant thus causing the temperature of the fluid medium surrounding the protective well 69 eventually to drop. This drop in temperature will have the effect of actuating the bimetal element 15 in a reverse direction to move the operating arm 16 in an upward or contact closing direction. As the armature 33 approaches the poles of magnet 49 the magnetic attraction becomes increasingly greater until it overcomes the tension of the bimetal element 15 whereupon the contacts close with a distinct snap action. Because of the flexible arm 36 the contacts close a slight interval prior to the time that the permanent magnet has completed its full travel. By reason of the foregoing snap action arrangement the contacts are opened and closed with a definite wiping action tending to maintain them electrically bright and clean, and also greatly reduce the tendency of arcing between them. Because of the pivoted arrangement of the rigid bar 35 on pivot 34 a leveling action between the two sets of contacts is provided so that equal pressure on each contact set is accomplished. In addition, the rigid bar 35 striking the rear of the movable contact point 38 holds the contacts firmly in engagement when closed. The use of flexible connections or pigtails is eliminated by providing the bridging type of contact structure wherein the circuit connection passes from the connecting wire (not shown) attached to terminal screw 45, through terminal plate 41, fixed contact stud 47, movable contact point 38, rigid bar 35, contact point 37, fixed contact stud 48, terminal plate 42, terminal screw 46 and to the connecting wire attached thereto. A further advantage of this type of snap action mechanism is that should the contacts stick or weld slightly, a positive prying action is produced due to the pull exerted upon the pivot pin 34, and the opening of either sets of contacts will effect an interruption of the electrical circuit.

If it is desired to remove the control device from service or to temporarily render its action ineffective, the dial plate 59 is rotated so that the indicator 60 points to the "off" position indication stamped on the dial. In this position the cam 58 is set so that its flat side is in engagement with the adjusting arm 25. In this position of the cam the bimetal element 15 has been moved about the pivot 22 so that the operating arm 16 has opened the contact mechanism. Should the bimetal elements 15 now be exposed to the action of an elevated heating medium the operating arm 16 would be moved in an upward direction tending to close the switching mechanism. This is prevented, however, by the action of the stop bracket 28 attached to the end of the arm 16 which engages the bottom of the adjusting arm 25 before the contacts can close, thereby effectively preventing their closure.

The control device is provided with various adjustments and calibrating means for properly assembling and operating the various parts. The slots in the top leg of bimetal element 15 engaged by screws 17 for holding arm 16 enables the operating arm 16 to be shifted laterally so as to properly align the movable and fixed contacts. The screw hole slots for screws 29 in insulating plate 27 enables the plate to be properly adjusted on the end of the operating arm to further align the contacts.

The differential operation between the cut-in and cut-out operating point of the control may be varied by adjusting the contact studs 47 or 48 the proper amount so that more or less of a gap is provided between the armature 33 and the magnet 49 to vary the magnetic influence thereupon. The foregoing differential adjustment will remain constant over the complete range of temperature values at which the thermal elements may be set to respond.

In order to properly calibrate the position of the dial plate 59 upon the end of the shaft 53 with respect to the action of the bimetal element 15, the set screw 63 is loosened and the dial 59 rotated upon the shaft the proper distance. Tightening the screw 63 again forces the sides of the slot 64 apart to expand the end of the shaft and thereby firmly hold the dial 59 in its set position upon the end of the shaft.

In Fig. 4 there is shown a modification of the device of Figs. 1 and 2 in which the switching contacts 37—48 and 47—38 are arranged to be normally open or disengaged from each other so that the control device operates in a reverse acting manner. To provide for this arrangement it is necessary that the dial scale plate 59 be one in which the temperature indicating numerals thereon are arranged in a reverse manner from that disclosed in Fig. 2 and the bimetal element 15 must be made inside out, as it were, so that the contacts are actuated to open upon a rise in temperature instead of close. To accomplish this the bimetal element 15 must be made so that the non-expansible portion of the bimetal is arranged on the outside of the element and the expansible on the inside or in a reverse manner from that of Fig. 1. In all similar aspects this modification is the same as that disclosed in Fig. 1 and its resultant operation and adjustment is the same.

Referring specifically to Figs. 5 and 6, another modified form of the control device is illustrated in which the casing and supporting means is constructed on somewhat simpler lines. The contact switching mechanism and the thermal actuating arrangement are the same as that illustrated in Fig. 1, the principal difference residing in the adjusting means for adjusting the temperature range of the device. The casing 71 is preferably made of insulation material and has a similar cover 72 held in place by screws 73. Projecting from the bottom of the casing 71 is a pair of terminal brackets 74 and 75 provided with wire connecting terminal screws 76 and 77 respectively. The terminal brackets are secured to the casing 71 by means of countersunk screws 78 and 79 threaded through the front thereof. The permanent magnet 49 is secured to the casing by means of a clamping screw 80.

The modified adjusting means comprises an adjustable cam member 81 having a peripheral portion generally of the same shape as cam 58 of Fig. 1, and this cam 81 in the same manner is arranged to engage the end 25 of the adjusting arm or lever 25 at various points along its periphery. A pivot pin 82 having an enlarged head and serving as a bearing for the cam 81 is riveted, as shown in Fig. 6, to the mounting plate 5. An adjustable indicator or pointer 83 is positioned directly below the cam 81 and is held firmly in its adjusted position by means of an adjusting screw 84 passing through a sleeve 85. The screw 84 is arranged to be movable and adjusted to any set position in a slot 86 cut in cam 81. The purpose of the screw 84 is to calibrate the indicator 83 with reference to the indicating scale stamped upon the front of the supporting plate 5, as shown.

A spring washer 87 is positioned on the shaft 82 between the indicator 83 and a spacing washer 88 for the purpose of supplying frictional engagement between these elements to maintain the cam 81 in its adjusted position. A pair of stops 89 and 90 are riveted to the supporting plate 5 and serve to limit the rotative adjusting movement of the cam 81 in either direction.

The operation of this modification is generally similar to that of Fig. 1 in that the screw 84 and sleeve 85 are grasped and the cam manually adjusted to the particular temperature value on the scale at which the contacts are arranged to open and when this value is reached by the fluid medium surrounding the well 67, the bimetal element 15 expands and moves the operating arm 16 to open the contacts. Moving the cam 81 to any other predetermined adjusted position varies the temperature point at which the contacts will be opened. The "off" position for the control device is assumed when pointer 83 is rotated in a left-hand direction until it encounters the stop 89. In this position the end 25 of the adjusting arm 18 is positioned so that the stop bracket 28 engages the adjusting arm end 25 before the contacts engage.

The modified arrangement disclosed in Figs. 7, 8, 9 and 10 is essentially the same as that of Fig. 1 with the exception that the contact switching structure is constructed somewhat differently. In this form of the invention the contact structure illustrated constitutes a single pole double throw type switch. A contact point 91 is carried by the end of the flexible bar 36 and a metal contact bracket 92 formed in the shape illustrated is arranged on the block 39 and carries an adjustable contact stud 93 at one end which has a contact point normally in engagement with contact point 91. A second contact bracket 94 is arranged on block 39 and it also carries an adjustable contact stud 95 at one end thereof. A double headed contact stud 96 has its shank portion loosely supported in an aperture in the rigid bar 35 and is rigidly secured to the end of the flexible bar 36. This contact stud 99 is arranged for movement between the fixed contact points 48 and 95 while the contact point 91 remains at all times in constant engagement with contact stud 93. The fixed contact stud 47 is adapted to engage the rigid bar 35 in certain instances. The contact bracket 94 is secured to the insulaing block 39 by a screw 97 which threads into terminal bracket 42. contact bracket 92 is supported in the same manner by screw 98 threading into terminal bracket 41. An insulating plate 99 is preferably placed over the bottom side of the terminal brackets 92 and 94 and a small insulating washer 101 surrounds screw 97 so as to electrically insulate the terminal plate 42 from the contact bracket 94. The terminal plate 41 and contact bracket 92 are, however, electrically connected together by the screw 98. Contact plate 94 is provided with an extension 102 passing upwardly through the insulating block 39 which carries a terminal screw 103 near its end for the purpose of attaching connecting wires thereto (not shown). With the foregoing arrangement it is seen that the terminal screw 103 serves as a means of connecting a source of current supply for the contact point 95 while terminal screw 46 serves the same purpose for the contact 48. The terminal screw 45, however, electrically connects both contact points 47 and 93 together.

The switching mechanism may be set to operate in the same manner as previously described in connection with Fig. 1 in that the contacts may be actuated at any desired temperature value to which the dial plate 59 has been set. In the normal position, as shown in Fig. 7, the contact stud 96 engages contact point 48 while contact point 91 is in engagement with contact point 93, and the rigid bar 35 engages the contact point 47. Upon the operation of the thermal element 15 of the device the contacts are actuated with snap action as has been previously pointed out to the position shown in Fig. 10 with the contact stud 96 separated from contact 48 and in engagement with contact 47. Because of the flexibility of the flexible arm 36 the contact 91 remains in engagement with contact 93 during the movement of contact stud 96 between its contacts so that the continuity of the circuit is always maintained. The rigid bar 35 strikes the rear of contact point 91 and the flexure of flexible arm 36 produces a wiping action on the contacts which is conducive to good electrical conductivity.

The contact stud 96 is similarly actuated with the rigid bar 35 striking a blow against the rear portion of the contact points in either direction of motion. Due to the flexure of flexible arm 36 the contacts remain in engagement for a short interval until the magnet has assumed full control against the tension stored in the bi-metal element, whereby good snap action is attained. The particular arrangement illustrated enables the movement of the stud 96 between its associated contacts to be performed with definite snap action in both directions of movement without the necessity of providing an additional permanent magnet. The arrangement of the contact brackets 93, 94 and 102 enables the conversion of the two wire control device, such as Fig. 1, by a simple modification into a three-wire control device.

From the foregoing it will be seen that a simple and compact control device is provided in which relatively few and simple parts and elements are so arranged as to provide simple operating functions, coupled with ease of adjustment and assembly. The particular novel arrangement of the thermal element and adjusting means upon the base provides for the most effective manner of adjusting the bimetal element response without affecting its sensitivity, and since no pivots or hinge points are provided between the thermal element and the switching mechanism, the action is positive and direct.

While the control device has been shown in its simplest and modified forms it will be apparent that further modifications may be conceived by those skilled in the art. It is therefore not desired that the invention be limited to the particular disclosures pointed out but only by the extent of the appended claims.

What is claimed is:

1. In a control device, a base, control means supported thereon, a generally U-shaped thermal element for operating said control means extending outwardly and perpendicularly from the rear of the base, a control operating arm secured to one leg of the thermal element, adjusting means on the base for adjusting the temperature value at which the thermal element operates the control means, an adjusting arm controlled by the adjusting means secured to the other leg of the thermal element, said operating arm and said adjusting arm arranged in parallel spaced relationship and extending to the front of the base, and spring means arranged for normally biasing said adjusting arm against said adjusting means.

2. In a control device, a base, control means arranged on the front of the base, a generally U-shaped thermal element at the rear of the base, a control operating arm secured to one leg of the thermal element, adjusting means arranged on the front of the base for adjusting the temperature value at which the thermal element operates the control means, an adjusting arm secured to the other leg of the thermal element, said adjusting arm and said control arm being arranged in spaced parallel relationship and extending to the front of the base, means arranged between the thermal element legs and the control and operating arms for biasing the adjusting arm against the adjusting means, and stop means on the end of the operating arm adapted to engage the end of the adjusting arm for preventing the operation of the control means at any temperature value.

3. In a control device, a base, a pair of parallel spaced supporting brackets extending outwardly from the rear of the base and arranged perpendicular to the base, a U-shaped thermal element arranged between and parallel to the supporting brackets and extending beyond the free ends thereof, control means on the base, adjusting means on the base for adjusting the temperature value at which the thermal element operates the control means, a control operating arm secured to one leg of the thermal element and controlled by the adjusting means, an adjusting arm controlled by the adjusting means secured to the other leg of the thermal element, said operating arm and said adjusting arm arranged in spaced parallel relationship between the suporting brackets, and means for pivoting said adjusting arm to said supporting brackets whereby the adjusting arm is pivotably adjusted by the adjusted means.

4. In a control device, a base, a pair of parallel spaced supporting brackets arranged perpendicular to the plane of the base and disposed to extend outwardly from the rear of the base, a generally U-shaped thermal element arranged between the supporting brackets and extending beyond the free ends thereof, said thermal element being so disposed that a plane through one of its legs is substantially perpendicular to the plane of the base, control means on the base, adjusting means on the base for adjusting the temperature value at which the thermal element operates the control means, a control operating arm secured to one leg of the thermal element and controlled by the adjusting means, an adjusting arm controlled by the adjusting means secured to the other leg of the thermal element, said operating arm and said adjusting arm arranged in spaced parallel relationship between the supporting brackets, means for pivoting said adjusting arm to said supporting brackets whereby the adjusting arm is pivotally adjusted by the adjusting means, said operating arm arranged to be actuated by the thermal element in a direction perpendicular of the adjusting arm to operate the control means, and spring means engaging said adjusting arm pivot and said adjusting arm for biasing the adjusting arm against the adjusting means.

5. In a control device, a supporting base having an aperture therein, a pair of parallel spaced supporting brackets extending perpendicularly to the base through said base aperture and having one end secured to the base, a thermal element arranged between the supporting brackets and extending beyond the free ends thereof, said thermal element being so disposed that a plane through one of its legs is substantially perpendicular to the plane of the base, a control arm secured to one end of the thermal element, an adjusting arm secured to the other end of the thermal element, both of said arms extending through said base aperture to the front of the base and arranged in spaced parallel relationship, control means on the base operated by the free end of the operating arm, adjusting means on the base engaging the free end of the adjusting arm for adjusting the temperature value at which the thermal element actuates the control means, and means for pivoting the adjusting arm to the free ends of the supporting brackets.

6. In a control device, a supporting base, a supporting bracket extending perpendicularly outwardly from the rear of the base and fastened at one end thereto, a generally U-shaped thermal element extending from the end of the bracket, a control operating arm secured to one leg of the thermal element, an adjusting arm secured to the other leg of the thermal element, both of said arms arranged in spaced parallel relationship with the supporting bracket and between the base and the thermal element, pivot means for pivoting the adjusting arm to the free end of the supporting bracket, control means operated by the free end of the operating arm, adjusting means engaging the free end of the adjusting arm for predetermining the temperature value at which the thermal element actuates the control means, and spring means arranged between the operating arm and the actuating arm having one end engaging the adjusting arm pivot and the other end engaging the adjusting arm for biasing the adjusting arm against the adjusting means.

7. In a control device, a supporting base, a supporting bracket extending perpendicularly of the base and fastened at one end thereto, a generally U-shaped thermal element extending from the end of the bracket, a control operating arm secured to one leg of the thermal element, an adjusting arm secured to the other leg of the thermal element, both of said arms arranged in spaced parallel relationship with the supporting bracket and between the base and the thermal element, pivot means for pivoting the adjusting arm to the free end of the supporting bracket, control means operated by the free end of the operating arm, adjusting means engaging the free end of the adjusting arm for predetermining the temperature value at which the thermal element actuates the control means, spring means arranged between the operating arm and the actuating arm having one end engaging the adjusting arm pivot and the other end engaging the adjusting arm for biasing the adjusting arm against the adjusting means, a second pivot means on the supporting bracket engaged by the spring means for applying tension to the spring means, and means on both of said pivot means and the adjusting arm for maintaining the spring means in proper alignment with respect to the arms.

8. In a control device, a base, control means on the base, a thermal element for operating the control means, adjusting means for predetermining the temperature value at which the thermal element operates the control means, said adjusting means comprising a rotatable shaft having one end engaging a bearing surface in the base, means operated by the shaft for adjusting the thermal element, a dial plate on the shaft having temperature indicia arranged thereon, said shaft having a slot arranged in its end to enable the shaft to be rotated to make an adjustment, and means including an adjusting screw on the shaft engaging the dial plate for adjusting the position of the dial plate on the shaft to calibrate it with the operation of the thermal element, said adjusting screw threaded into the shaft on one side of the shaft slot and engaging the other side whereby the shaft end is expanded to firmly hold the dial plate in its calibrated position on the shaft.

9. In a control device, a base, a generally U-shaped thermal element, an operating arm secured to one leg of the thermal element and operated thereby, an adjusting arm secured to the other leg of the thermal element, both of said arms and said thermal element extending perpendicular of the base and arranged in spaced parallel relationship, movable control means including an armature connected to the end of the operating arm, and fixed control means including a magnet supported on the base and arranged in operative relation to the movable control means, said magnet and armature cooperating to produce snap action to the operation of the movable control means, and adjusting means for predetermining the temperature value at which the thermal element actuates the control means, said adjusting means comprising a cam engaging the adjusting arm, and an adjustable shaft extending perpendicularly of the base for supporting the cam.

10. In a control device, a physical condition responsive element, an operating arm actuated by said element, a rigid contact bar secured to the operating arm, a single movable contact flexibly secured to one end of the rigid bar, and a double movable contact flexibly secured to the other end of the rigid bar, a first set of oppositely disposed fixed contacts arranged on each side of the double contact whereby the double contact is movable between them, a second set of fixed contacts arranged so that the rigid bar is adapted to engage one of the fixed contacts of the second set and the single contact engages the other fixed contact of the second set, said rigid bar also arranged to engage the rear of both movable contacts in one direction of their operation, and cooperating magnetic means arranged between the two sets of fixed contacts for imparting snap action to the movement of the contacts by the operating arm.

11. In a control device, a shaft having a split section, a wheel and hub adapted to slide over the shaft, means for expanding the split section of the shaft against the inner surface of the hub whereby the hub and wheel are secured to the shaft, said expanding means comprising a screw threaded perpendicularly through one portion of the split section of the shaft and disposed to abut against another portion of said split section, and said hub provided with an aperture therein through which said screw extends for limiting the rotary motion of the wheel relative to the shaft prior to expansion of the shaft and for preventing lateral motion of the wheel along the shaft while said shaft is being expanded and after said shaft is expanded.

12. In a control instrument, a base, an elongated member at the rear of the base and attached thereto, said member being adapted to associate said base with a fluid container, a generally U-shaped structure extending generally perpendicular of the base adjacent said member so as to be protected thereby, said structure forming a thermal responsive means the legs of which move toward and away from each other on change in temperature, a control device arranged on the front of the base and actuated by one of the legs of the thermal responsive means, and adjusting means located at the front of the base for actuating the other leg of the thermal responsive means to adjust the temperature at which the control device is actuated.

13. In a control instrument, a base formed to provide an opening, an elongated member adapted for associating said base with a fluid container, said member extending rearwardly from said base adjacent the opening therein, a generally U-shaped structure extending generally perpendicular of the base adjacent said member so as to be protected thereby, said structure forming a thermal responsive means, the legs of which move toward or away from each other upon change in temperature, one of said legs extending through said opening to the front of the base, a control device arranged on the front of the base and actuated by said one leg of said thermal responsive means, and adjusting means located at the front of said base for adjusting the temperature at which the control device is actuated.

14. In a control instrument, a base formed to provide an opening, an elongated member adapted for associating said base with a fluid container, said member extending rearwardly from said base adjacent the opening therein, a generally U-shaped structure extending generally perpendicular of the base adjacent said member so as to be protected thereby, said structure forming a thermal responsive means, the legs of which move toward or away from each other upon change in temperature, one of said legs extending through said opening to the front of the base, a control device arranged on the front of the base and actuated by said one leg, and adjusting means located at the front of the base and engaging the other of said legs for adjusting the temperature at which the control device is actuated.

15. In a control instrument, a base formed to provide an opening, an elongated member adapted for associating said base with a fluid container, said member extending rearwardly from said base adjacent the opening therein, a generally U-shaped structure extending generally perpendicular of the base adjacent said member so as to be protected thereby, said structure forming a thermal responsive means, the legs of which move toward or away from each other upon change in temperature, a control device mounted on the base and actuated by one leg of said thermal responsive means, the other leg of said thermal responsive means extending through said opening to the front of the base, and adjusting means located on the front of said base and engaging said other leg for adjusting the temperature at which the control device is actuated.

16. In a control device adapted for mounting on a fluid container having a wall formed with an opening therein, the combination of, a base structure formed with an opening therein, means for mounting the base structure on the wall of the fluid container with the opening facing said wall and in alignment with the opening therein, said base structure including a rearwardly extending portion adapted to extend into said opening in the fluid container wall, a generally U-shaped structure extending through both of said openings adjacent said rearwardly extending portion and into the fluid container, said U-shaped structure forming a thermal responsive means the legs of which move toward and away from each other on change in temperature, the bight of the U-shaped structure being located within the fluid container and the legs of said U-shaped structure extending to the front of the base structure, a pivot for said U-shaped structure carried by said base structure, a control device arranged on the front of the base and actuated by one of the legs of the U-shaped structure, and adjusting means located at the front of the base for actuating the other leg of the U-shaped structure, said adjusting means serving to rock said U-shaped structure about its pivot for determining the temperature at which the control device is actuated.

17. In a control device adapted for mounting on a fluid container having a wall formed with an opening therein, the combination of, a base structure adapted for mounting on the wall of the fluid container and including a portion extending generally parallel with said wall, said parallel portion of the base structure being formed to provide an opening facing said wall in alignment with the opening in said wall, a generally U-shaped structure extending outwardly and perpendicularly from the rear of said parallel portion of the base structure through both of said openings into the fluid container, said structure forming a thermal responsive means the legs of which move toward and away from each other on change in temperature, the bight of the U-shaped structure being located within the fluid container and the legs of said U-shaped structure extending to the front of the parallel portion of the base structure, a pivot for said U-shaped structure carried by said base structure, a control device arranged on the base structure at the front of said parallel portion and actuated by one of the legs of the U-shaped structure, and adjusting means located at the front of said parallel portion for actuating the other leg of the U-shaped structure, said adjusting means serving to rock said U-shaped structure about its pivot for determining the temperature at which the control device is actuated.

HOMER E. MALONE.